US012122157B2

(12) United States Patent
Lee et al.

(10) Patent No.: US 12,122,157 B2
(45) Date of Patent: Oct. 22, 2024

(54) INKJET HEAD

(71) Applicant: Samsung Display Co., LTD., Yongin-si (KR)

(72) Inventors: Dong Jun Lee, Yongin-si (KR); Che Ho Lim, Cheonan-si (KR); Kang Soo Han, Seoul (KR); Ho-Yong Shin, Suwon-si (KR); Gyeong Eun Eoh, Seongnam-si (KR); Jun Hwi Lim, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 55 days.

(21) Appl. No.: 17/869,697

(22) Filed: Jul. 20, 2022

(65) Prior Publication Data

US 2023/0134046 A1 May 4, 2023

(30) Foreign Application Priority Data

Oct. 29, 2021 (KR) ........................ 10-2021-0146702

(51) Int. Cl.
*B41J 2/14* (2006.01)
*B41J 2/175* (2006.01)
*B41J 2/18* (2006.01)

(52) U.S. Cl.
CPC ....... *B41J 2/14201* (2013.01); *B41J 2/17563* (2013.01); *B41J 2/18* (2013.01); *B41J 2002/14403* (2013.01); *B41J 2002/14419* (2013.01); *B41J 2/17503* (2013.01); *B41J 2202/12* (2013.01)

(58) Field of Classification Search
CPC ...... B41J 2/14201; B41J 2/17563; B41J 2/18; B41J 2/17503; B41J 2002/14403; B41J 2002/14419; B41J 2202/12
See application file for complete search history.

(56) References Cited

U.S. PATENT DOCUMENTS 8,657,420 B2 * 2/2014 Hoisington .......... B41J 2/14233 347/85

FOREIGN PATENT DOCUMENTS

| | | | |
|---|---|---|---|
| JP | 2010194801 | A | 9/2010 |
| JP | 6561987 | B2 | 8/2019 |
| JP | 6597257 | B2 | 10/2019 |
| JP | 6755671 | B2 | 9/2020 |

* cited by examiner

*Primary Examiner* — Geoffrey S Mruk
(74) *Attorney, Agent, or Firm* — CANTOR COLBURN LLP

(57) ABSTRACT

An embodiment of the present invention provides an inkjet head including: a head body having a storage chamber capable of storing ink; a first inlet pipe and a second inlet pipe connected to the head body and which extend in first different directions and inject the ink in the first different directions; a first outlet pipe and a second outlet pipe connected to the head body and which extend in second different directions and eject the ink in the second different directions; and a nozzle plate positioned under the head body and which includes a plurality of nozzles.

18 Claims, 13 Drawing Sheets

INKJET HEAD

This application claims priority to Korean Patent Application No. 10-2021-0146702, filed on Oct. 29, 2021, and all the benefits accruing therefrom under 35 U.S.C. § 119, the content of which in its entirety is herein incorporated by reference.

BACKGROUND

(a) Technical Field

The present disclosure relates to an inkjet head.

(b) Description of the Related Art

An inkjet device includes an inkjet head having a nozzle for ejecting ink. The inkjet head may eject ink from a plurality of nozzle holes formed in a nozzle surface. The inkjet head may form wires of a display panel, a color filter, or various thin films such as spacers by ejecting a conductive material, a color filter material, a curable material, or an insulating material as ink onto a substrate.

The ink may contain particles for each of the materials described above together with a solvent.

SUMMARY

Particles in ink have a relatively large specific gravity and settle easily in an inkjet head.

Embodiments have been made in an effort to prevent defects such as spots of an image by preventing functional deviation of a thin film of a display panel printed using an inkjet head by preventing a concentration of ejected ink from being changed depending on a position of a nozzle due to non-uniform settling and dispersion of ink particles in the inkjet head.

In addition, the embodiments have been made in an effort to reduce an ink material cost by preventing wastage of an ink material by preventing unnecessary operations such as ink purge to control concentration dispersion of ink ejected from the nozzle of the inkjet head.

An embodiment of the present invention provides an inkjet head including: a head body having a storage chamber capable of storing ink; a first inlet pipe and a second inlet pipe connected to the head body and which extend in first different directions and inject the ink in the first different directions; a first outlet pipe and a second outlet pipe connected to the head body and which extend in second different directions and ejecting the ink in the second different directions; and a nozzle plate positioned under the head body and which includes a plurality of nozzles.

The first inlet pipe and the second inlet pipe may be positioned at a first end of the head body, and the first outlet pipe and the second outlet pipe may be positioned at a second end of the head body facing the first edge.

The first inlet pipe and the first outlet pipe may extend in a first direction, and the second inlet pipe and the second outlet pipe may extend in a second direction that is perpendicular to the first direction.

The inkjet head may further include a first filter and a second filter positioned within the storage chamber and which extend in third different directions.

The first filter may extend parallel to the nozzle plate, and may overlap the first inlet pipe and the first outlet pipe in a plan view, and the second filter may be positioned inside the second inlet pipe, and may overlap the second inlet pipe in a direction in which the second inlet pipe extends.

The first filter may be positioned below the first inlet pipe and the first outlet pipe and above the second inlet pipe and the second outlet pipe.

The inkjet head may further include a third filter positioned in the storage chamber and spaced apart from an inner surface of the head body.

The third filter may be connected to the first filter and the second filter, and the third filter may be extended in a direction in which the second filter is extended.

The inkjet head may further include a cover plate positioned within the storage chamber and between the first filter and the nozzle plate, and the cover plate may be positioned below the second inlet pipe and overlaps the nozzles on the plan view.

The cover plate may include a pair of edge portions adjacent to opposite edges of an inner surface of the head body in the second direction, and a central portion positioned between the pair of edge portions and connected to the pair of edge portions, and a width of the central portion in a third direction may be smaller than a width of the edge portions in the third direction.

The edge portions may be in contact with the inner surface of the head body, and the central portion may be spaced apart from the inner surface of the head body.

The cover plate may define one or more holes therein.

The holes may not overlap the nozzles in the plan view.

The cover plate may have a mesh or net shape.

The inkjet head may further include: a first flow controller positioned on a lower, inner surface of the head body and which does not overlap the nozzles in the plan view, and the first flow controller may be positioned between a side, inner surface of the body and an outer nozzle row among a plurality of nozzle rows in which the nozzles are arranged, and the first flow controller may extend along the outer nozzle row.

The inkjet head may further include a second flow controller positioned on the lower, inner surface of the head body and which does not overlap the nozzles in the plan view, and the second flow controller may be positioned between two adjacent inner nozzle rows positioned inside among the nozzle rows, and the second flow controller may extend along the inner nozzle rows.

The first flow controller and the second flow controller may have a pointed top, and a height of the second flow controller may be greater than a height of the first flow controller.

An embodiment of the present invention provides an inkjet head including: a head body having a storage chamber capable of storing ink; a first inlet pipe and a second inlet pipe connected to the head body; a first outlet pipe and a second outlet pipe connected to the head body; a nozzle plate positioned under the head body and which includes a plurality of nozzles; and a first filter and a second filter positioned within the storage chamber and which extend in different directions, where the first filter extends parallel to the nozzle plate and overlaps the first inlet pipe in a plan view, the second filter is positioned inside the second inlet pipe, and overlaps the second inlet pipe in a direction in which the second inlet pipe extends, and the ink includes at least one of quantum dots or scatterers.

An embodiment of the present invention provides an inkjet head including: a head body having a storage chamber capable of storing ink; one or more inlet pipes and one or more outlet pipes connected to the head body; a nozzle plate positioned under the head body and which includes a plurality of nozzles; a filter positioned in the storage chamber and which overlaps the inlet pipe; and a cover plate positioned within the storage chamber and between the filter and the nozzle plate, where the cover plate overlaps the nozzles in a plan view, and the cover plate defines one or more holes therein.

An embodiment of the present invention provides an inkjet head including: a head body having a storage chamber capable of storing ink; one or more inlet pipes and one or more outlet pipes connected to the head body; a nozzle plate positioned under the head body and which includes a plurality of nozzles; and a first flow controller and a second flow controller positioned on a lower, inner surface of the head body and which does not overlap the nozzles in a plan view, where the first flow controller is positioned between a side, inner surface of the body and an outer nozzle row among a plurality of nozzle rows in which the nozzles are arranged, the first flow controller extends along the outer nozzle row, the second flow controller is positioned between two adjacent inner nozzle rows positioned inside among the nozzle rows, and the second flow controller extends along the inner nozzle rows.

The first flow controller and the second flow controller may have a pointed top, and a height of the second flow controller may be greater than a height of the first flow controller.

According to the embodiments, it is possible to effectively prevent defects such as spots of an image by preventing functional deviation of a thin film of a display panel printed using an inkjet head by preventing a concentration of ejected ink from being changed depending on a position of a nozzle due to non-uniform sedimentation and dispersion of ink particles in the inkjet head.

In addition, according to the embodiments, it is possible to reduce an ink material cost by preventing wastage of an ink material by preventing unnecessary operations such as ink purge to control concentration dispersion of ink ejected from the nozzle of the inkjet head.

DETAILED DESCRIPTION

Figure 1:
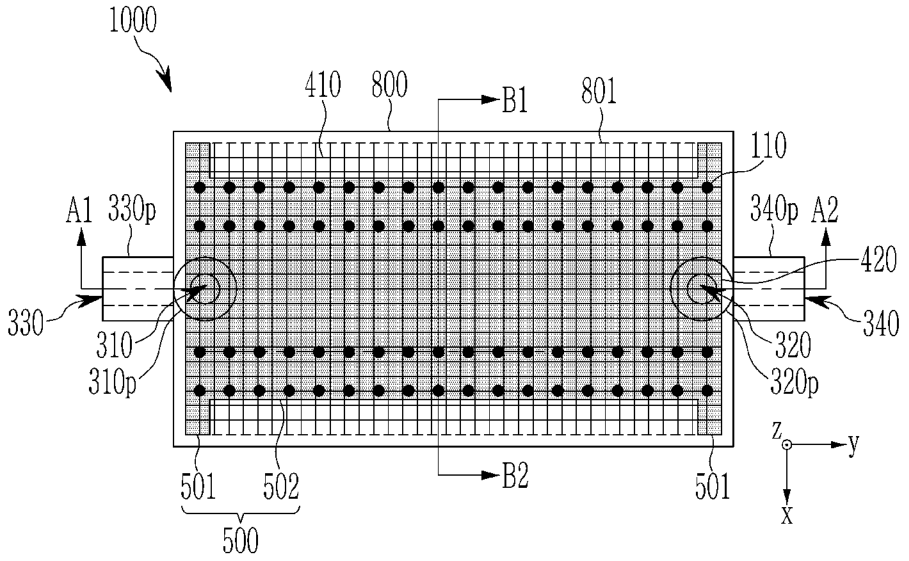
FIG. 1 and FIG. 2 each illustrate a top plan view of an inkjet head according to an embodiment.

The present invention will be described more fully hereinafter with reference to the accompanying drawings, in which embodiments of the invention are shown. As those skilled in the art would realize, the described embodiments may be modified in various different ways, all without departing from the spirit or scope of the present invention.

To clearly describe the present invention, parts that are irrelevant to the description are omitted, and like numerals refer to like or similar constituent elements throughout the specification.

Further, since sizes and thicknesses of constituent members shown in the accompanying drawings are arbitrarily given for better understanding and ease of description, the present invention is not limited to the illustrated sizes and thicknesses. In the drawings, the thicknesses of layers, films, panels, regions, etc., are exaggerated for clarity. In the drawings, for better understanding and ease of description, the thicknesses of some layers and areas are exaggerated.

It will be understood that when an element such as a layer, film, region, or substrate is referred to as being "on" another element, it can be directly on the other element or intervening elements may also be present. In contrast, when an element is referred to as being "directly on" another element, there are no intervening elements present. Further, in the specification, the word "on" or "above" means positioned on or below the object portion, and does not necessarily mean positioned on the upper side of the object portion based on a gravitational direction.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above (i.e., view in a z direction), and the phrase "in a cross-sectional view" means when a cross-section taken by vertically cutting an object portion is viewed from the side.

An inkjet head according to an embodiment will be described with reference to FIG. 1 to FIG. 4.

Figure 2:
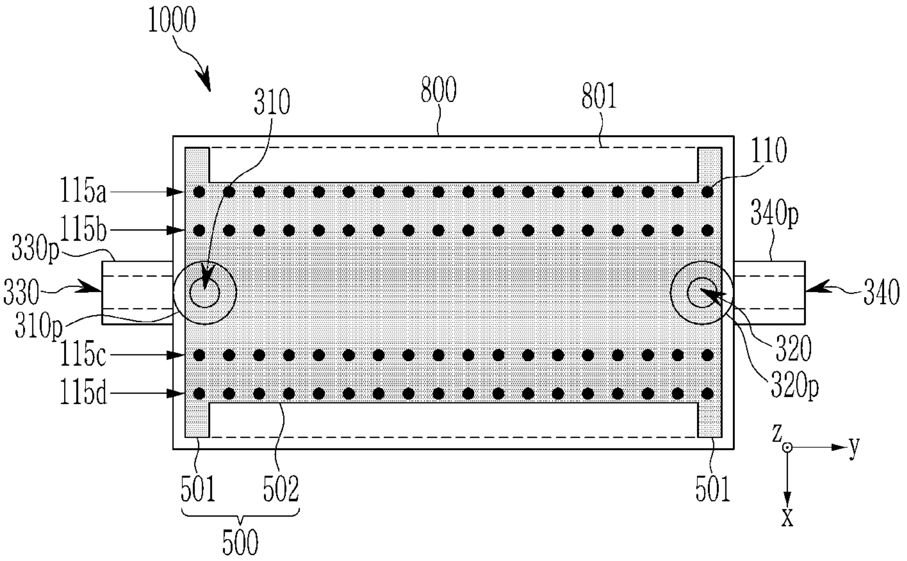
Figure 3:
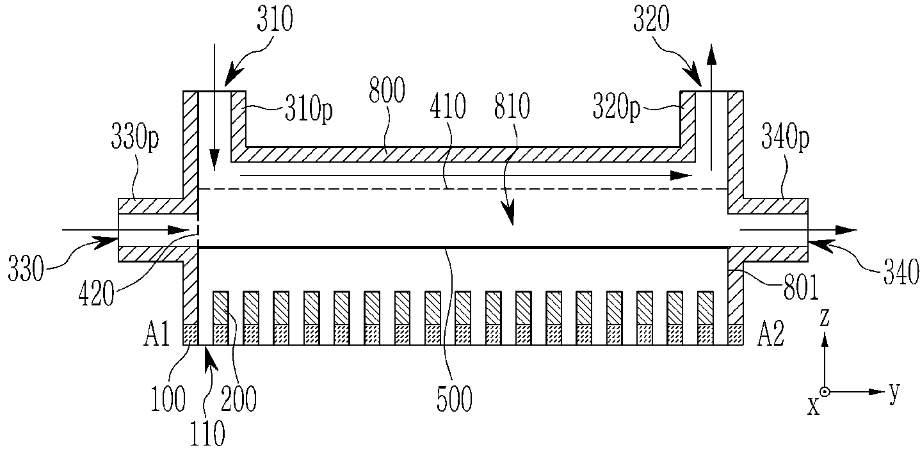
FIG. 3 illustrates a cross-sectional view of the inkjet head illustrated in FIG. 1 taken along line A1-A2.
Figure 4:
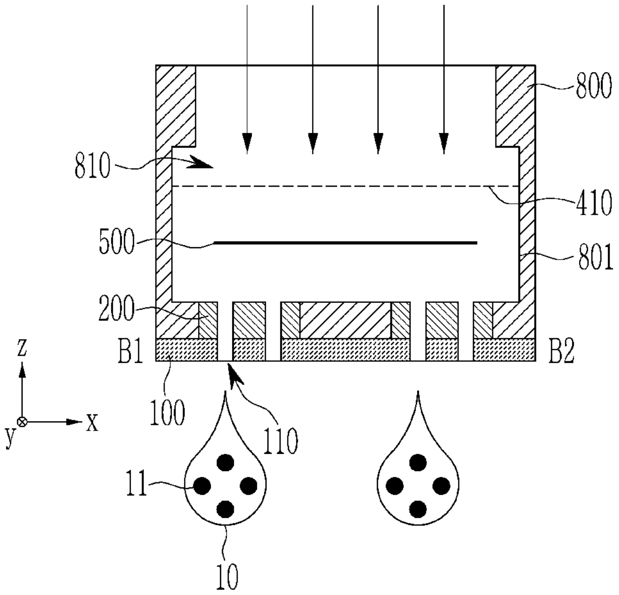
FIG. 4 illustrates a cross-sectional view of the inkjet head illustrated in FIG. 1 taken along line B1-B2.

FIG. 1 and FIG. 2 each illustrate a top plan view of an inkjet head according to an embodiment, FIG. 3 illustrates a cross-sectional view of the inkjet head illustrated in FIG. 1 taken along line A1-A2, and FIG. 4 illustrates a cross-sectional view of the inkjet head illustrated in FIG. 1 taken along line B1-B2.

An inkjet head 1000 according to an embodiment includes a head body 800, a plurality of inlet pipes 310*p* and 330*p*, a plurality of outlet pipes 320*p* and 340*p*, a nozzle plate 100, a first filter 410, a second filter 420, and a cover plate 500.

The head body 800 has a storage chamber 810 capable of storing ink. The head body 800 has an inner surface 801.

The ink to be stored in the storage chamber 810 may vary depending on purpose of an inkjet device including an inkjet head. For example, the ink may include a conductive material, a color filter material, a curable material, an insulating material, an emission layer material, or a color conversion layer material, and various films such as wires of a display panel, color filters, spacers, and emission layers may be formed by ejecting ink onto substrate.

The emission layer material or the color conversion layer material included in the ink may include, e.g., a semiconductor nano-crystal, and the semiconductor nanocrystal may include at least one of a phosphor, a quantum dot, or a scatterer. The quantum dot may have a core-shell structure including a core including semiconductor nanocrystals and a shell surrounding the core.

The ink contains particles for each of the materials described above together with a solvent.

The inlet pipes may include a first inlet tube 310*p* and a second inlet pipe 330*p* each having inlets for injecting ink in different directions, and the outlet pipes may include a first outlet pipe 320*p* and a second outlet pipe 340*p* having outlets for ejecting ink in different directions.

The first inlet pipe 310*p* has a first inlet 310 through which ink may be injected. The first inlet pipe 310*p* may be positioned at a side (e.g., top side of the head body 800) facing the nozzle plate 100, and may be positioned at an end (e.g., left end) of the head body 800. The first inlet 310 and the first inlet pipe 310*p* may extend in a z direction, but the present invention is not limited thereto. The first inlet 310 is connected to the storage chamber 810.

The first outlet pipe 320*p* has a first outlet 320 through which ink may be ejected. The first outlet pipe 320*p* may be positioned at a side (e.g., top side of the head body 800) facing the nozzle plate 100, and may be positioned at an end (e.g., right end) opposite to the end (e.g., left end) where the first inlet pipe 310*p* is positioned among ends of the head body 800. The first outlet 320 and the first outlet pipe 320*p* may extend in the z direction, but the present invention is not limited thereto. The first outlet 320 is connected to the storage chamber 810.

The second inlet pipe 330*p* has a second inlet 330 through which ink may be injected. The second inlet pipe 330*p* may be positioned at the end (e.g., left end) of the head body 800 in which the first inlet pipe 310*p* is positioned. The second inlet 330 and the second inlet pipe 330*p* may extend in a y-direction perpendicular to the z-direction, but the present invention is not limited thereto. The second inlet 330 is connected to the storage chamber 810.

The second outlet pipe 340*p* has a second outlet 340 through which ink may be ejected. The second outlet pipe 340*p* may be positioned at an end (e.g., right end) of the head body 800 where the first outlet pipe 320*p* is positioned, and may be positioned to face the second inlet pipe 330*p*. The second outlet 340 and the second outlet pipe 340*p* may extend in they direction, but the present invention is not limited thereto. The second outlet 340 is connected to the storage chamber 810.

The first inlet pipe 310*p* and the second inlet pipe 330*p* are positioned at a first end (e.g., left end) of the head body 800, and the first outlet pipe 320*p* and the second outlet pipe 340*p* may be positioned at a second end (e.g., right end) of the head body 800 facing the first end.

The nozzle plate 100 is positioned under the head body 800, and includes (in other words, "defines") a plurality of nozzles 110 that are holes through which ink 10 can be ejected downward.

The nozzles 110 may be arranged to form a plurality of nozzle rows 115*a*, 115*b*, 115*c*, and 115*d* on an xy plane (i.e., plane defined by x direction and y direction). As used herein, the "nozzle row" means a row of nozzles. The nozzle rows 115*a*, 115*b*, 115*c*, and 115*d* each may extend in the y direction. Referring to FIG. 1 and FIG. 2, an example in which the nozzles 110 are arranged to form four nozzle rows 115*a*, 115*b*, 115*c*, and 115*d* is illustrated, but the number of nozzle rows according to the invention is not limited thereto.

A piezoelectric element 200 may be positioned on the nozzle plate 100 and between the adjacent nozzles 110. When a driving signal is applied to the piezoelectric element 200, the nozzle 110 may be contracted or expanded to easily eject ink by deformation of the piezoelectric element 200.

The first inlet pipe 310*p*, the first outlet pipe 320*p*, the second inlet pipe 330*p*, the second outlet pipe 340*p*, and the nozzle plate 100 may be formed in or connected to the head body 800 to form the inkjet head 1000 in a bonded form.

The nozzle plate 100 is positioned at a bottom of the head body 800, and the first inlet pipe 310*p*, the first outlet pipe 320*p*, the second inlet pipe 330*p*, and the second outlet pipe 340*p* are positioned above the nozzle plate 100. The second inlet pipe 330*p* and the second outlet pipe 340*p* may be positioned below the first inlet pipe 310*p* and the first outlet pipe 320*p*, respectively. Herein, up and down directions are based on the z direction, and are the same hereafter.

The first filter 410 is positioned in the storage chamber 810, may extend parallel to the xy plane, and may be parallel to the nozzle plate 100. Referring to FIG. 1 and FIG. 3, the first filter 410 may overlap most of an interior space of the head body 800 in a top plan view. In this case, as illustrated in FIG. 1 and FIG. 3, an edge of the first filter 410 may be in contact with an inner surface 801 of the head body 800.

The storage chamber 810 may be divided into an upper area and a lower area with respect to the first filter 410 as a boundary.

The first filter 410 may be positioned below the first inlet pipe 310*p* and the first outlet pipe 320*p* and above the second inlet pipe 330*p* and the second outlet pipe 340*p*. The first filter 410 may overlap the first inlet pipe 310*p* and the first outlet pipe 320*p* in a top plan view.

The first filter 410 may block impurities other than particles 11 of an ink material injected from the first inlet 310, and then may pass the ink to a lower side of the first filter 410. To this end, the first filter 410 may have a hole sized enough to pass the particles 11 of the ink material and to block impurities larger than the particles 11.

The ink that is injected as indicated by a straight arrow pointing down in the z direction in FIG. 3 and FIG. 4 may move downward through the first filter 410 after impurities are removed, and the impurities may move along the straight arrow in the y direction on the first filter 410 in FIG. 3 along the first filter 410 and may again be externally ejected through the first outlet 320 as indicated by a straight arrow pointing upward in the z direction.

The first filter 410 may be omitted in a certain embodiment.

The second filter 420 is positioned in the storage chamber 810, and may extend parallel to the xz plane (See FIG. 3). The second filter 420 is positioned inside the second inlet 330, and may be positioned at a boundary between the second inlet 330 and the storage chamber 810. That is, the second filter 420 may overlap the second inlet 330 and the second inlet pipe 330*p* on the xz plane (i.e., a view in y direction).

The second filter 420 may block injection of impurities other than the particles 11 of the ink material injected from the second inlet 330, and then may send the ink to the storage chamber 810. To this end, the second filter 420 may have a hole sized enough to pass the particles 11 of the ink material and to block impurities larger than the particles 11.

The second filter 420 may have a same material and structure as those of the first filter 410. The second filter 420 may be connected to or separated from the first filter 410.

The ink that is injected as indicated by a straight arrow in the y-direction in the second inlet 330 in FIG. 3 may be injected to the storage chamber 810 after impurities are removed through the second filter 420.

The cover plate 500 is positioned in the storage chamber 810, and may extend parallel to the xy plane. The cover plate 500 may be positioned between the first filter 410 and the nozzle plate 100, and positioned below the second inlet 330.

Referring to FIG. 1 to FIG. 4, the cover plate 500 may overlap the nozzles 110 on the xy plane (i.e., in a top plan view).

The cover plate 500 may block the particles 11 of the ink material injected to the storage chamber 810 from settling directly toward the nozzle 110.

The cover plate 500 may have a continuous plane. The cover plate 500 may include opposite edge portions 501 and a central portion 502 therebetween on the xy plane (i.e., in the plan view). The central portion 502 may be connected to the pair of edge portions 501, and may be integrally formed (i.e., monolithic) with the edge portions 501.

The opposite edge portions 501 may be positioned in regions adjacent to left and right ends of the inner surface 801 of the head body 800 in which the first inlet 310, the second inlet 330, the first outlet 320, and the second outlet 340 are positioned. The edge portions 501 may overlap the first inlet 310 or the first inlet pipe 310*p*, and the first outlet 320 and the first outlet pipe 320*p* on the xy plane (i.e., in the plan view).

The edge portions 501 may serve to block the ink, which is injected to or ejected from the storage chamber 810 through the first inlet 310, the second inlet 330, the first outlet 320, or the second outlet 340, from not-circulating and settling directly into the nozzle 110.

Edges of the edge portions 501 may be in contact with the inner surface 801 of the head body 800.

An x-directional width of the central portion 502 is smaller than an x-directional width of each of the edge portions 501. As illustrated in FIG. 1, FIG. 2, and FIG. 3, the central portion 502 is spaced apart from an inner wall of the head body 800, and thus ink may flow toward the nozzle plate 100 through a space between the central portion 502 and the head body 800.

Upper and lower edges of the central portion 502 in FIG. 2 may be spaced apart from the inner surface 801 of the head body 800.

Without the second inlet 330 and the second outlet 340, a circulating amount of the ink positioned under the first filter 410 may be reduced in the storage chamber 810, and thus settling of ink particles may easily occur, and it is easy to cause a deviation in concentration of ink particles depending on a position of the nozzle 110. Then, defects such as spots due to functional deviation of the thin film of the display panel formed using the inkjet head 1000 may occur.

However, according to the present embodiment, it is possible to improve circulation of ink in the storage chamber 810 by adding the second inlet 330 and the second outlet 340 in addition to the first inlet 310 and the first outlet 320. Thus, it is possible to prevent non-uniform dispersion in the concentration of ink particles due to particles settling in the space between the cover plate 500 and the head body 800. Resultantly, it is possible to effectively prevent non-uniformity of the concentration of the ink ejected depending on the position of the nozzle 110 by non-uniform settling and dispersion of the particles of the ink in the storage chamber 810, and defects such as image spots may be reduced by preventing functional deviation of the thin film of the display panel formed by using the inkjet head 1000 according to the invention. In addition, there is no need to perform operations such as ink purge for controlling the concentration distribution of the particles 11 of the ink 10, thereby preventing wastage of the ink material and reducing the ink material cost.

In addition, according to an embodiment, it is possible to prevent the particles of the ink injected, from directly descending to the nozzle 110 by the cover plate 500.

The cover plate 500 may include a metal, but the present invention is not limited thereto.

According to another exemplary embodiment, the cover plate 500 may be omitted.

The second filter 420 between the second inlet 330 and the storage chamber 810 may reduce imbalance in purification of ink in the space between the first filter 410 and the nozzle plate 100 while blocking impurities in the ink.

Since the second inlet 330 is positioned on the cover plate 500, it is possible to prevent ink vortex flow directly above the nozzle plate 100 and to prevent sedimentation of particles on the cover plate 500.

An inkjet head according to another embodiment will be described with reference to FIG. 5 to FIG. 7.

Figure 5:
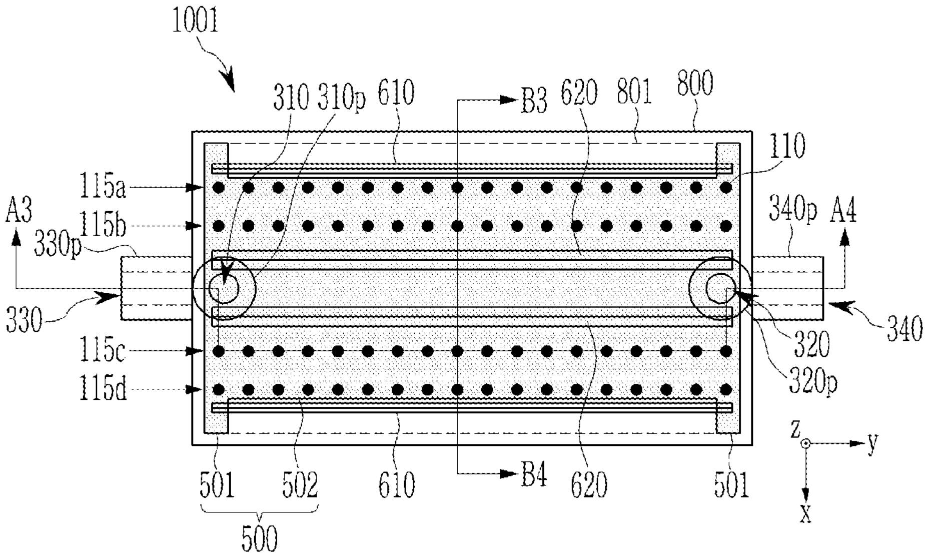
FIG. 5 illustrates a top plan view of an ink head according to another embodiment.
Figure 6:
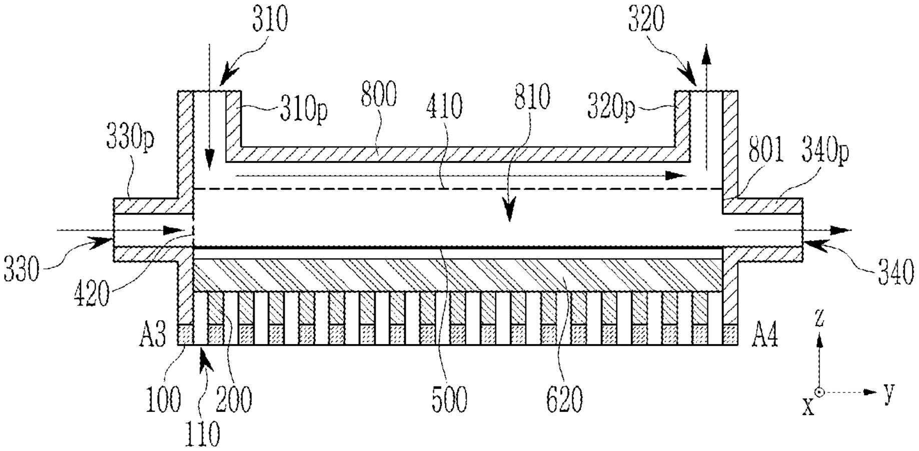
FIG. 6 illustrates a cross-sectional view of the inkjet head illustrated in FIG. 5 taken along line A3-A4.
Figure 7:
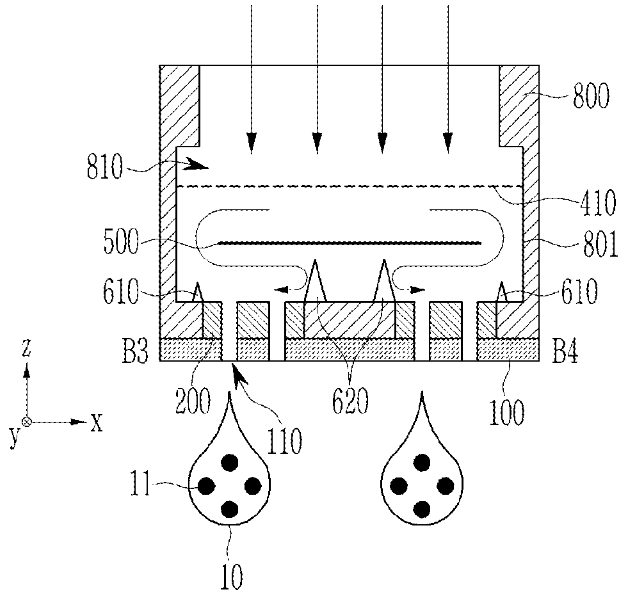
FIG. 7 illustrates a cross-sectional view of the inkjet head illustrated in FIG. 5 taken along line B3-B4.

FIG. 5 illustrates a top plan view of an ink head according to another embodiment, FIG. 6 illustrates a cross-sectional view of the inkjet head illustrated in FIG. 5 taken along line A3-A4, and FIG. 7 illustrates a cross-sectional view of the inkjet head illustrated in FIG. 5 taken along line B3-B4.

An inkjet head 1001 according to the present embodiment is mostly the same as the inkjet head 1000 according to the embodiment illustrated in FIG. 1 to FIG. 4 described above, but may further include a first flow controller 610 and a second flow controller 620, which are positioned in the storage chamber 810 and are formed on a bottom surface of the head body 800 (See FIG. 7). In FIG. 5, the line A3-A4 is divided into two lines inside the head body 800: an upper line passing through the second flow controller 620, and a lower line passing through the nozzles 110.

The first flow controller 610 and the second flow controller 620 do not overlap the nozzles 110 on the xy plane (i.e., in the top plan view).

The first flow controllers 610 may be positioned outside the nozzle rows 115*a* and 115*d* at opposite edges among the nozzle rows 115*a*, 115*b*, 115*c*, and 115*d*, i.e., between the outer nozzle row 115*a* and the upper inner surface 801 of the head body 800 and between the outer nozzle row 115*d* and the lower inner surface 801 in FIG. 5.

The first flow controllers 610 each may be elongated in a direction in which the nozzle rows 115*a* and 115*d* extend, i.e., in the y-direction, and are adjacent to each of the nozzle rows 115*a* and 115*d* along the nozzle rows 115*a* and 115*d*.

A cross-sectional structure of the first flow controller 610 viewed on the xz plane (i.e., view in the y direction in FIG. 7) may have a substantially triangular shape with a pointed top, but the present invention is not limited thereto.

The second flow controllers 620 may be positioned between two inner nozzle rows 115*b* and 115*c* among the nozzle rows 115*a*, 115*b*, 115*c*, and 115*d*. Particularly, the second flow controller 620 may be positioned in a center of the bottom surface of the head body 800, and may be positioned between two adjacent nozzle rows 115*b* and 115*c*. One or more second flow controllers 620 may be positioned between the two adjacent nozzle rows 115*b* and 115*c*. FIG. 5 and FIG. 7 each illustrate an example in which two second flow controllers 620 are positioned between two adjacent nozzle rows 115*b* and 115*c* in the center, but a number of second flow controllers 620 according to the invention is not limited thereto.

The second flow controllers 620 each may be elongated in a direction in which the nozzle rows 115*b* and 115*c* extend, i.e., in the y-direction, and are adjacent to each of the nozzle rows 115*b* and 115*c* along the nozzle rows 115*b* and 115*c*.

A cross-section structure of the second flow controller 620 viewed on the xz plane (i.e., view in the y direction in FIG. 7) may have a substantially triangular shape with a pointed top, but the present invention is not limited thereto.

A z-directional height of the second flow controller 620 in the z direction may be greater than a z-directional height of the first flow controller 610. A cross-sectional size of the second flow controller 620 shown in FIG. 7 may be larger than a cross-sectional size of the first flow controller 610.

The first flow controller 610 may prevent the ink 10 injected in a direction of the straight arrows in FIG. 7 from settling around the cover plate 500 and being directly ejected to the outer nozzle rows 115*a* and 115*d*. The second flow controller 620 that is larger than the first flow controller 610 may induce sedimentation of the particles 11 by blocking a flow of the particle 11 around the inner nozzle rows 115*b* and 115*c* as indicated by the curved line arrows in FIG. 7. Accordingly, it is possible to improve relatively lower concentration of the particles 11 of the ink 10 in a central region of the nozzle plate 100 than the concentration of the particles 11 in an edge region of the nozzle plate 100 close to the space between the cover plate 500 and the left and right sides of the head body 800. Thus, the concentration of the particles 11 of the ink 10 passing through the nozzles 110 of the nozzle plate 100 may be made more uniform.

An inkjet head according to still another embodiment will be described with reference to FIG. 8 to FIG. 10.

Figure 8:
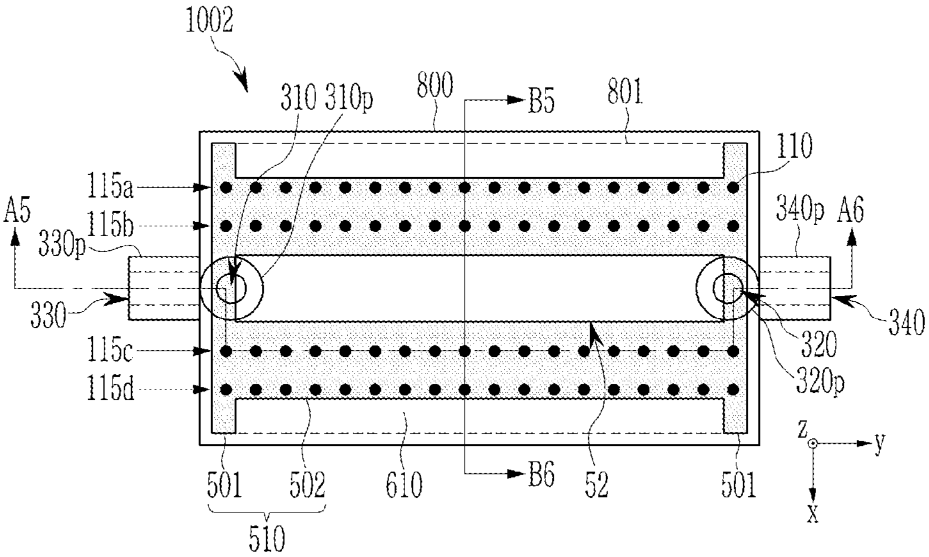
FIG. 8 illustrates a top plan view of an ink head according to still another embodiment.
Figure 9:
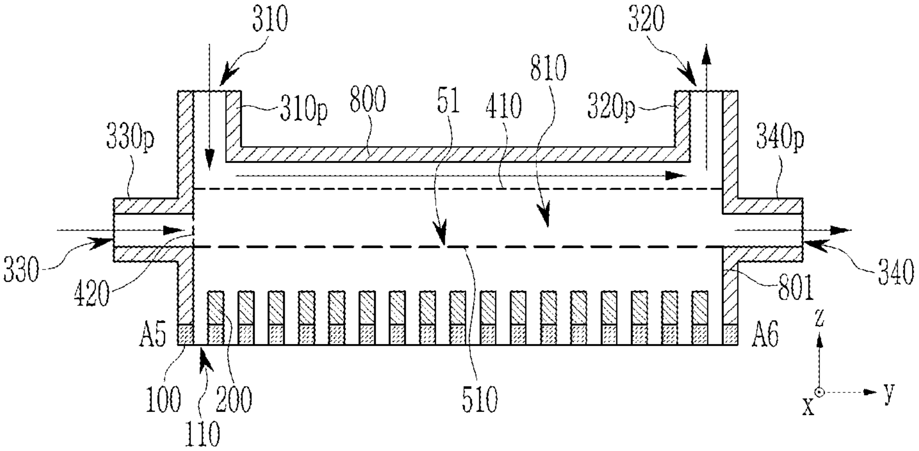
FIG. 9 illustrates a cross-sectional view of the inkjet head illustrated in FIG. 8 taken along line A5-A6.
Figure 10:
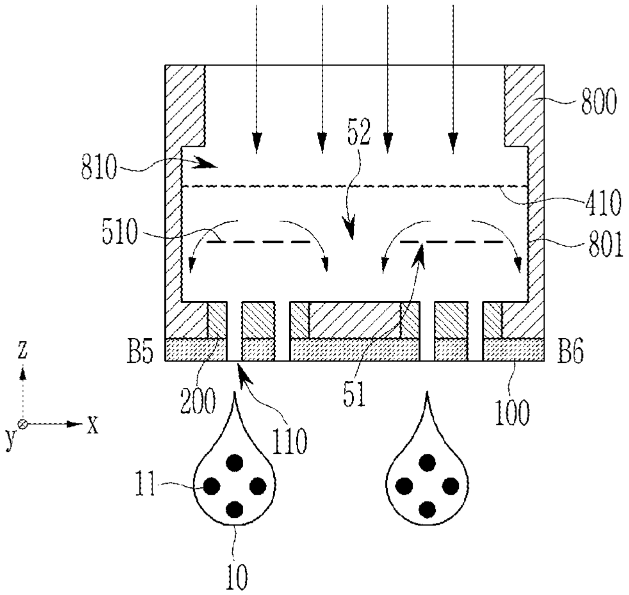
FIG. 10 illustrates a cross-sectional view of the inkjet head illustrated in FIG. 8 taken along line B5-B6.

FIG. 8 illustrates a top plan view of an ink head according to still another embodiment, FIG. 9 illustrates a cross-sectional view of the inkjet head illustrated in FIG. 8 taken along line A5-A6, and FIG. 10 illustrates a cross-sectional view of the inkjet head illustrated in FIG. 8 taken along line B5-B6.

The inkjet head 1002 according to the present embodiment is mostly the same as the inkjet head 1000 or the inkjet head 1001 described above, but may include a cover plate 510 instead of the cover plate 500.

The cover plate 510 may include (i.e., define) at least one hole 52 therein. The hole 52 may not overlap the nozzles 110 on the xy plane (i.e., in the plan view). Since the hole 52 does not overlap the nozzles 110, particles 11 of ink 10 descending through the hole 52 may be prevented from settling directly into the nozzles 110.

The at least one hole 52 may divide a central portion 502 into two or more regions. FIG. 8 illustrates an example in which one hole 52 divides the central portion 502 into two regions.

The particles 11 of the ink 10 may descend toward the nozzle plate 100 also through the hole 52 in the center of the cover plate 510 in addition to the space between the cover plate 510 and the left and right sides of the head body 800 as indicated by the curved arrows in FIG. 10, and thus it is possible to relatively improve a lower concentration of the particles 11 of the ink 10 in a central region of the nozzle plate 100 than the concentration of the particles 11 in an edge region of the nozzle plate 100 close to the space between the cover plate 510 and the left and right sides of the head body 800. Thus, the concentration of the particles 11 of the ink 10 passing through the nozzles 110 of the nozzle plate 100 may be made more uniform.

Referring to FIG. 9 and FIG. 10, the cover plate 510 may have a mesh or net shape. Accordingly, the cover plate 510 may include a plurality of holes 51. Each of the holes 51 is smaller than the hole 52 dividing the central portion 502 of the cover plate 510. The hole 51 may be larger than or equal to a size of the particles 11 of the ink. Accordingly, circulation of the particles 11 of the ink 10 by the cover plate 510 may be further improved.

In addition, the characteristics of the cover plate 500 of the above-described embodiment may be equally applied to the cover plate 510 according to the present embodiment.

An inkjet head according to yet another embodiment will be described with reference to FIG. 11 to FIG. 13.

Figure 11:
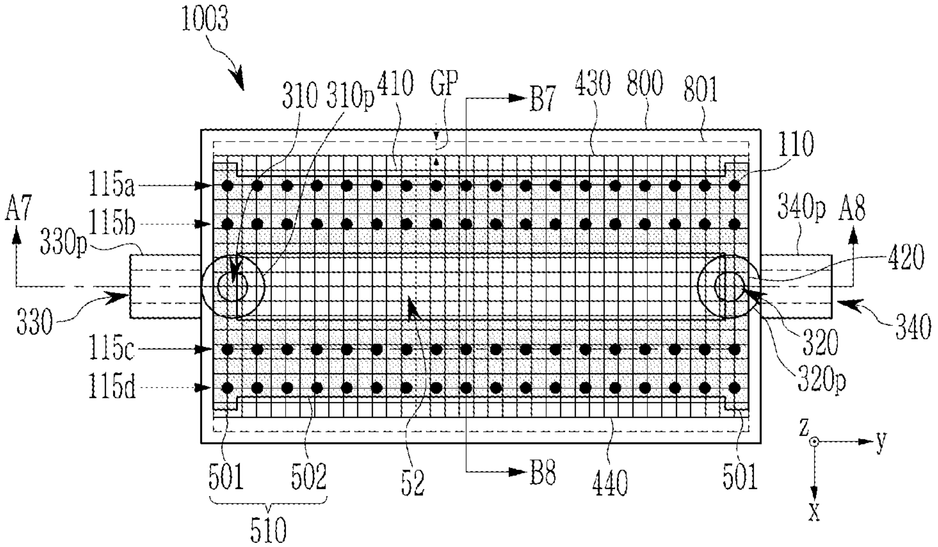
FIG. 11 illustrates a top plan view of an ink head according to yet another embodiment.
Figure 12:
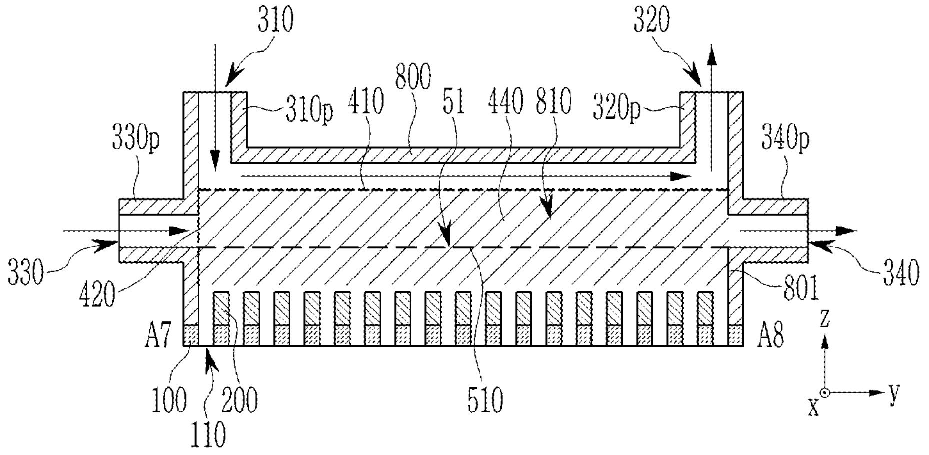
FIG. 12 illustrates a cross-sectional view of the inkjet head illustrated in FIG. 11 taken along line A7-A8.
Figure 13:
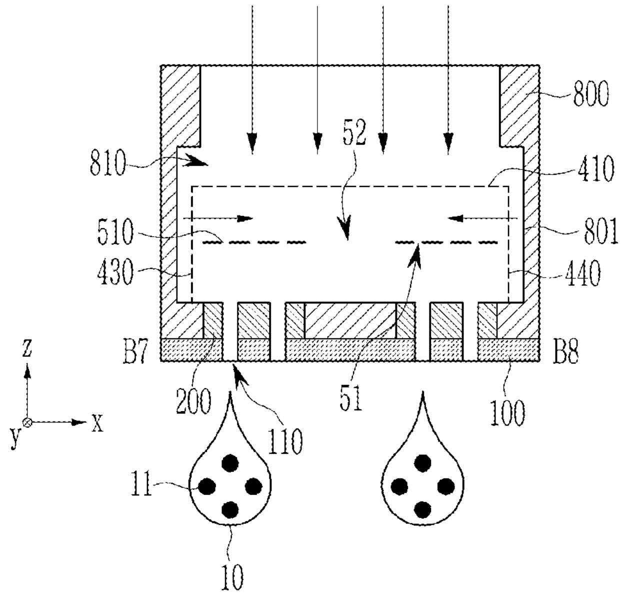
FIG. 13 illustrates a cross-sectional view of the inkjet head illustrated in FIG. 11 taken along line B7-B8.

FIG. 11 illustrates a top plan view of an ink head according to yet another embodiment, FIG. 12 illustrates a cross-sectional view of the inkjet head illustrated in FIG. 11 taken along line A7-A8, and FIG. 13 illustrates a cross-sectional view of the inkjet head illustrated in FIG. 11 taken along line B7-B8.

The inkjet head 1003 according to the present embodiment is mostly the same as the inkjet head 1000, the inkjet head 1001, and the inkjet head 1002 described above, but may further include a third filter 430 and a fourth filter 440.

In FIG. 11, the line A7-A8 do not pass through the third filter 430 or the fourth filter 440, but for convenience of understanding, the fourth filter 440 is illustrated in FIG. 12.

The third filter 430 and the fourth filter 440 may be positioned in the storage chamber 810, and each of them may extend parallel to the yz plane. The third filter 430 and the fourth filter 440 are positioned close to the opposite edges (i.e., left and right inner surfaces in FIG. 13) of the head body 800, respectively, and are spaced apart from the inner surface 801 of the head body 800 by an interval GP that is greater than 0. The third filter 430 and the fourth filter 440 may face each other with the cover plate 510 therebetween.

Referring to FIG. 12 and FIG. 13, the third filter 430 and the fourth filter 440 may be parallel to the yz plane. That is, the third filter 430 and the fourth filter 440 may extend from an upper region to a lower region of the cover plate 510 and extend in the y direction in which the first filter 410 extends.

Unlike in the above-described embodiment, referring to FIG. 11, upper and lower ends of the first filter 410 may be spaced apart from the inner surface 801 of the head body 800. Such a distance may be equal to the interval GP.

The third filter 430 and the fourth filter 440 may be connected to at least one of the first filter 410 or the second filter 420. In addition, the third filter 430 and the fourth filter 440 may be connected to the first filter 410 and the second filter 420 to form one overturned lid, and may overlap and cover the nozzles 110 at the bottom. The first filter 410, the second filter 420, the third filter 430, and the fourth filter 440 connected to each other may form a cuboid shape with an open bottom, but the shape formed by the filters together is not limited thereto, and other shapes such as a dome may be formed in another embodiment.

The third filter 430 and the fourth filter 440 may have the same material and function as those of the first filter 410 or the second filter 420. That is, the third filter 430 and the fourth filter 440 may pass the ink 10 toward the nozzle 110 after blocking impurities other than the particles 11 of the material of the ink 10 injected therein. To this end, the third filter 430 and the fourth filter 440 may have (i.e., define the hole therein) a hole sufficiently sized to pass the particles 11 of the ink material and to block impurities larger than the particles 11.

The ink that is injected as indicated by a straight arrow in FIG. 12 and FIG. 13 may move toward the nozzle 110 through the first filter 410, the second filter 420, the third filter 430, and the fourth filter 440 after the impurities are removed.

According to the present embodiment, the ink moves toward the nozzle plate 100 through the interval GP in the storage chamber 810 and passes through the third filter 430 and the fourth filter 440, and thus circulation of the ink 10 in the storage chamber 810 may be further improved by reducing the number of particles of which circulation is stagnant after passing through the first filter 410.

While this invention has been described in connection with what is presently considered to be practical embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: ink
11: particle
100: nozzle plate
110: nozzle
115*a*, 115*b*, 115*c*, 115*d*: row of nozzles
200: piezoelectric element
310, 330: inlet
310*p*, 330*p*: inlet pipe
320, 340: outlet
320*p*, 340*p*: outlet pipe
410, 420, 430, 440: filter
500, 510: cover plate
610, 620: flow controller
800: head body
801: inner side surface
810: storage chamber
1000, 1001, 1002, 1003: inkjet head

What is claimed is:

1. An inkjet head comprising:
a head body having a storage chamber capable of storing ink;
a first inlet pipe and a second inlet pipe respectively connected to the head body;
a first outlet pipe and a second outlet pipe respectively connected to the head body; and
a nozzle plate positioned under the head body and which includes a plurality of nozzles, wherein
the first inlet pipe extends along a first axis at outside of the storage chamber and is configured to inject the ink into the storage chamber along the first axis,
the second inlet pipe extends along a second axis different from the first axis at outside of the storage chamber, and is configured to inject the ink into the storage chamber along the second axis,
the first outlet pipe extends in a third axis at outside of the storage chamber, and is configured to eject the ink from the storage chamber along the third axis, and
the second outlet pipe extends along a fourth axis different from the third axis at outside of the storage chamber, and is configured to eject the ink from the storage chamber along the fourth axis.

2. The inkjet head of claim 1, wherein
the first inlet pipe and the second inlet pipe are positioned at a first end of the head body, and
the first outlet pipe and the second outlet pipe are positioned at a second end of the head body facing the first end.

3. The inkjet head of claim 2, wherein
the first axis is parallel to the third axis, and
the second axis is parallel to the fourth axis and is perpendicular to the first axis.

4. The inkjet head of claim 2, wherein
a first filter and a second filter positioned within the storage chamber,
the first filter extends along a fifth axis, and
the second filter extends along a sixth axis different from the fifth axis.

5. The inkjet head of claim 4, wherein
the first filter extends parallel to the nozzle plate, and overlaps the first inlet pipe and the first outlet pipe in a plan view, and
the second filter is positioned inside the second inlet pipe and overlaps the second inlet pipe along the second axis.

6. The inkjet head of claim 5, wherein
the first filter is positioned below the first inlet pipe and the first outlet pipe and above the second inlet pipe and the second outlet pipe.

7. The inkjet head of claim 6, further comprising:
a third filter positioned in the storage chamber and spaced apart from an inner surface of the head body.

8. The inkjet head of claim 7, wherein
the third filter is connected to the first filter and the second filter, and
the third filter extends along the sixth axis.

9. The inkjet head of claim 2, further comprising:
a first flow controller positioned on a lower, inner surface of the head body and which does not overlap the nozzles in a plan view, wherein the first flow controller is positioned between a side, inner surface of the body and an outer nozzle row among a plurality of nozzle rows in which the nozzles are arranged, and the first flow controller extends along the outer nozzle row.

10. The inkjet head of claim 9, further comprising a second flow controller positioned on the lower, inner surface of the head body and which does not overlap the nozzles in the plan view, wherein the second flow controller is positioned between two adjacent inner nozzle rows positioned inside among the nozzle rows, and the second flow controller extends along the inner nozzle rows.

11. The inkjet head of claim 10, wherein the first flow controller and the second flow controller have a pointed top, and a height of the second flow controller is greater than a height of the first flow controller.

12. An inkjet head comprising:

a head body having a storage chamber capable of storing ink;

a first inlet pipe and a second inlet pipe connected to the head body;

a first outlet pipe and a second outlet pipe connected to the head body; and a nozzle plate positioned under the head body and which includes a plurality of nozzles, wherein the first inlet pipe extends along a first axis and is configured to inject the ink along the first axis, the second inlet pipe extends in a second axis different from the first axis and is configured to inject the ink along the second axis, the first outlet pipe extends along a third axis and is configured to eject the ink along the third axis, and the second outlet pipe extends along a fourth axis different from the third axis and is configured to eject the ink along the fourth axis, the first inlet pipe and the second inlet pipe are positioned at a first end of the head body, the first outlet pipe and the second outlet pipe are positioned at a second end of the head body facing the first end, a first filter and a second filter positioned within the storage chamber, the first filter extends along a fifth axis, the second filter extends along a sixth axis different from the fifth axis, the first filter extends parallel to the nozzle plate, and overlaps the first inlet pipe and the first outlet pipe in a plan view, the second filter is positioned inside the second inlet pipe and overlaps the second inlet pipe along the second axis, a cover plate is positioned within the storage chamber and between the first filter and the nozzle plate, and the cover plate is positioned below the second inlet pipe and overlaps the nozzles on the plan view.

13. The inkjet head of claim 12, wherein the cover plate includes a pair of edge portions adjacent to opposite edges of an inner surface of the head body along the second axis, and a central portion positioned between the pair of edge portions and connected to the pair of edge portions, and a width of the central portion in a specific direction is smaller than a width of the edge portions in the specific direction.

14. The inkjet head of claim 13, wherein the edge portions are in contact with the inner surface of the head body, and the central portion is spaced apart from the inner surface of the head body.

15. The inkjet head of claim 12, wherein the cover plate defines one or more holes therein.

16. The inkjet head of claim 15, wherein the holes do not overlap the nozzles in the plan view.

17. The inkjet head of claim 15, wherein the cover plate has a mesh or net shape.

18. An inkjet head comprising:

a head body having a storage chamber capable of storing ink;

a first inlet pipe and a second inlet pipe respectively connected to the head body, each of the first inlet pipe and the second inlet pipe configured to inject the ink into the storage chamber;

a first outlet pipe and a second outlet pipe respectively connected to the head body, each of the first outlet pipe and the second outlet pipe configured to eject the ink from the storage chamber;

a nozzle plate positioned under the head body and which includes a plurality of nozzles; and a first filter and a second filter positioned within the storage chamber and which extend in different directions, wherein the first filter extends parallel to the nozzle plate and overlaps the first inlet pipe in a plan view, the second filter is positioned inside the second inlet pipe, and overlaps the second inlet pipe in a direction in which the second inlet pipe extends, and the ink includes at least one of quantum dots or scatterers.

* * * * *